US012434397B2

(12) United States Patent
Donahoe

(10) Patent No.: US 12,434,397 B2
(45) Date of Patent: Oct. 7, 2025

(54) UTILITY BEARD KNIFE DEVICE

(71) Applicant: Gerric Donahoe, Temecula, CA (US)

(72) Inventor: Gerric Donahoe, Temecula, CA (US)

(*) Notice: Subject to any disclaimer, the term of this patent is extended or adjusted under 35 U.S.C. 154(b) by 259 days.

(21) Appl. No.: 18/202,132

(22) Filed: May 25, 2023

(65) Prior Publication Data

US 2024/0391119 A1 Nov. 28, 2024

(51) Int. Cl.
*B26B 11/00* (2006.01)
*A45D 24/36* (2006.01)

(52) U.S. Cl.
CPC .............. *B26B 11/00* (2013.01); *A45D 24/36* (2013.01)

(58) Field of Classification Search
None
See application file for complete search history.

(56) References Cited

U.S. PATENT DOCUMENTS 1,015,026 A * 1/1912 Jackson .................... B25F 1/04 7/168
1,510,420 A * 9/1924 Sherman ................. B26B 11/00 134/143
4,148,140 A * 4/1979 Lile ......................... B26B 1/046 30/161
4,187,607 A 2/1980 Simuro
4,336,815 A 6/1982 Ross
4,730,394 A * 3/1988 Sonner, Jr. .............. B26B 1/048 D7/649
4,890,386 A 1/1990 Collier
5,699,615 A * 12/1997 Chen ....................... B26B 1/044 30/267
D483,641 S 12/2003 Martin
D551,050 S * 9/2007 Ping ................................ D8/99
D602,199 S 10/2009 Ortega
D992,396 S * 7/2023 Liu .................................. D8/99
2010/0299934 A1* 12/2010 VanHoy .................. B26B 1/046 30/161
2024/0391119 A1* 11/2024 Donahoe ................ A45D 24/36

FOREIGN PATENT DOCUMENTS

GB 1503337 3/1978

* cited by examiner

*Primary Examiner* — Hwei-Siu C Payer

(57) ABSTRACT

A utility beard knife device includes a handle that has a lengthwise channel. A blade is pivotally coupled to the handle and the blade is positionable in a stored position or a deployed position. A first knob extends away from the blade for gripping and a first lock is movably integrated into the blade for retaining the blade at a variety of positions. A comb is pivotally coupled to the handle and the comb is positionable in a stored position or a deployed position. A second knob extends away from the comb for gripping and a second lock is movably integrated into the comb for retaining the comb at a variety of positions. A belt clip is attached to the handle for attaching to a garment to carry the handle.

11 Claims, 7 Drawing Sheets

UTILITY BEARD KNIFE DEVICE

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to utility knife devices and more particularly pertains to a new utility knife device for combining cutting and beard grooming. The device includes a blade pivotally attached to a handle for and a comb pivotally attached to the handle for grooming a beard. Each of the blade and the comb are positionable between a deployed position and a stored position. A pair of locks is integrated into the handle a releasably engages a respective one of the blade and the comb for retaining the blade and the comb at a variety of positions.

(2) Description of Related Art Including Information Disclosed Under 37 CFR 1.97 and 1.98

The prior art relates to utility knife devices including a variety of utility knives that includes the combination of a blade and a comb pivotally attached to a handle and a reciprocating blade slidably integrated into a handle. In no instance does the prior art disclose a utility beard knife device that includes a blade and a comb pivotally attached to a handle and a pair of locks movably integrated into a respective blade and comb for retaining the blade and the comb at a variety of positions.

(h) BRIEF SUMMARY OF THE INVENTION

An embodiment of the disclosure meets the needs presented above by generally comprising a handle that has a lengthwise channel. A blade is pivotally coupled to the handle and the blade is positionable in a stored position or a deployed position. A first knob extends away from the blade for gripping and a first lock is movably integrated into the blade for retaining the blade at a variety of positions. A comb is pivotally coupled to the handle and the comb is positionable in a stored position or a deployed position. A second knob extends away from the comb for gripping and a second lock is movably integrated into the comb for retaining the comb at a variety of positions. A belt clip is attached to the handle for attaching to a garment to carry the handle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
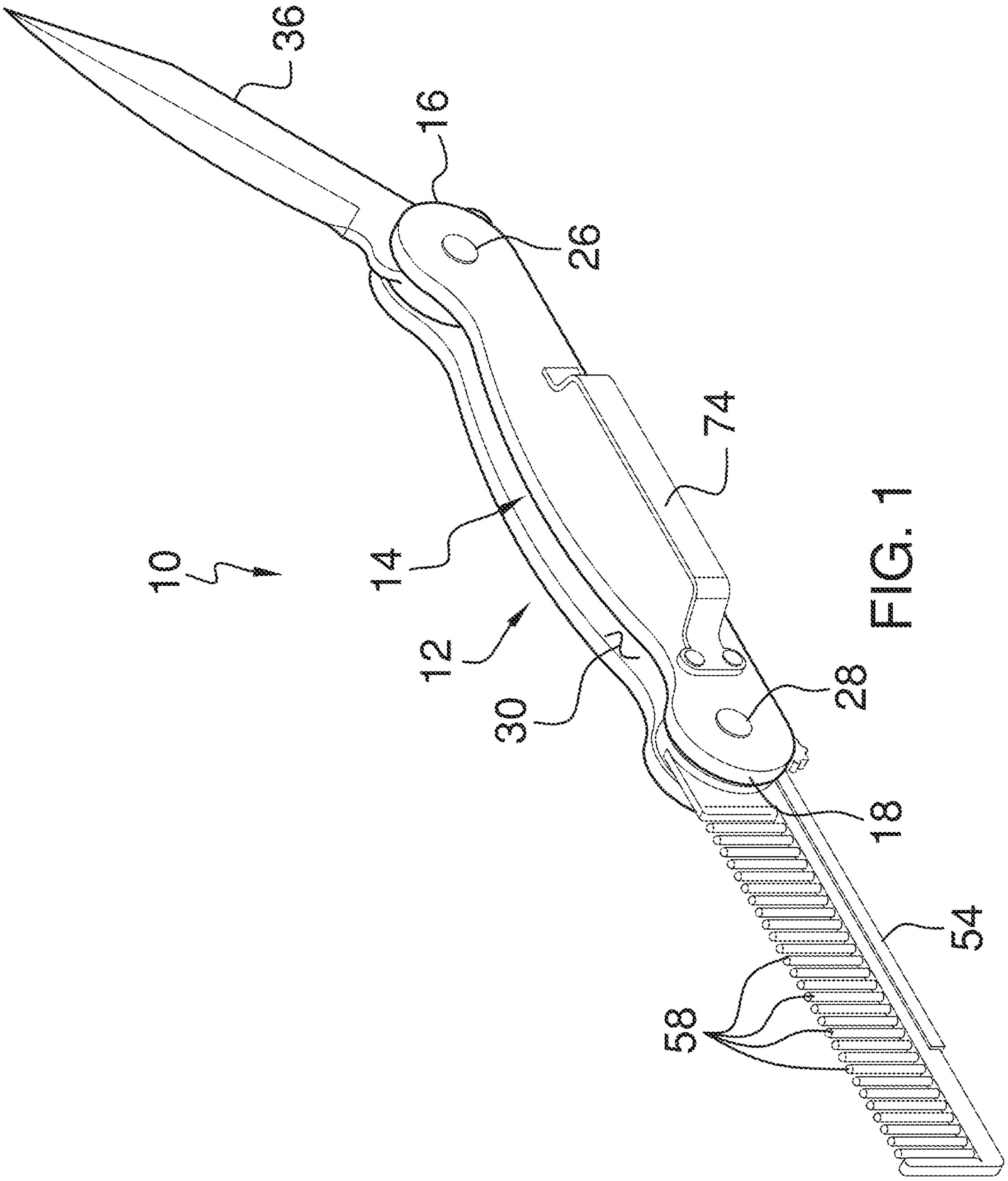
FIG. 1 is a perspective view of a utility beard knife device according to an embodiment of the disclosure.
Figure 2:
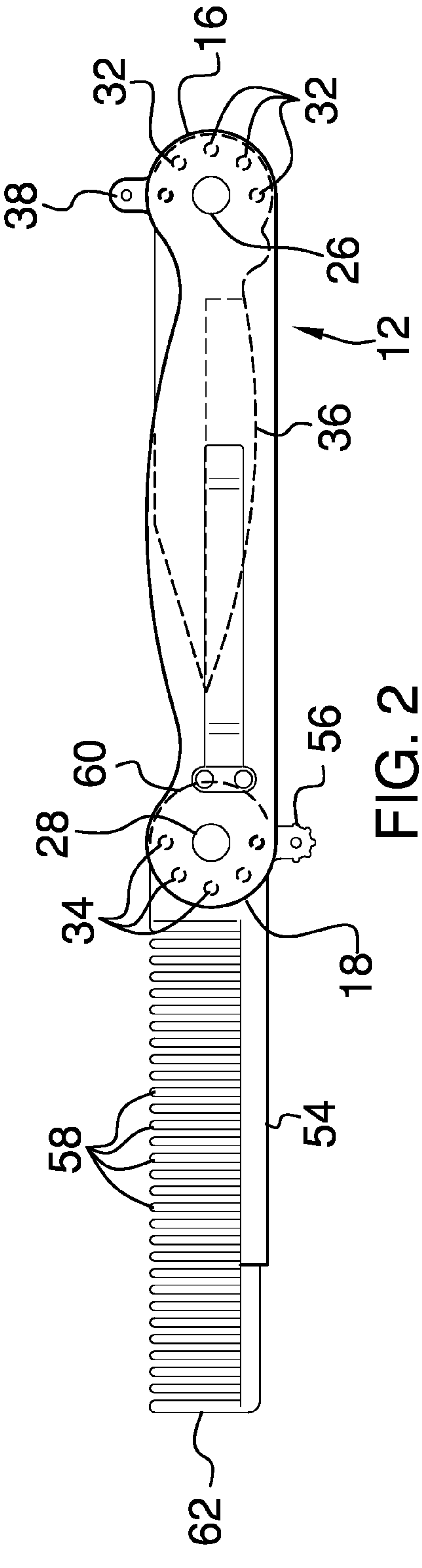
FIG. 2 is a left side phantom view of an embodiment of the disclosure.
Figure 4:
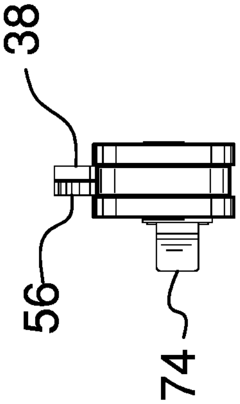
FIG. 4 is a back view of an embodiment of the disclosure.
Figure 3:
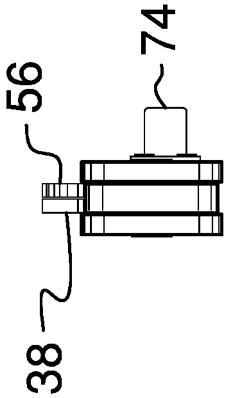
FIG. 3 is a front view of an embodiment of the disclosure.
Figure 5:
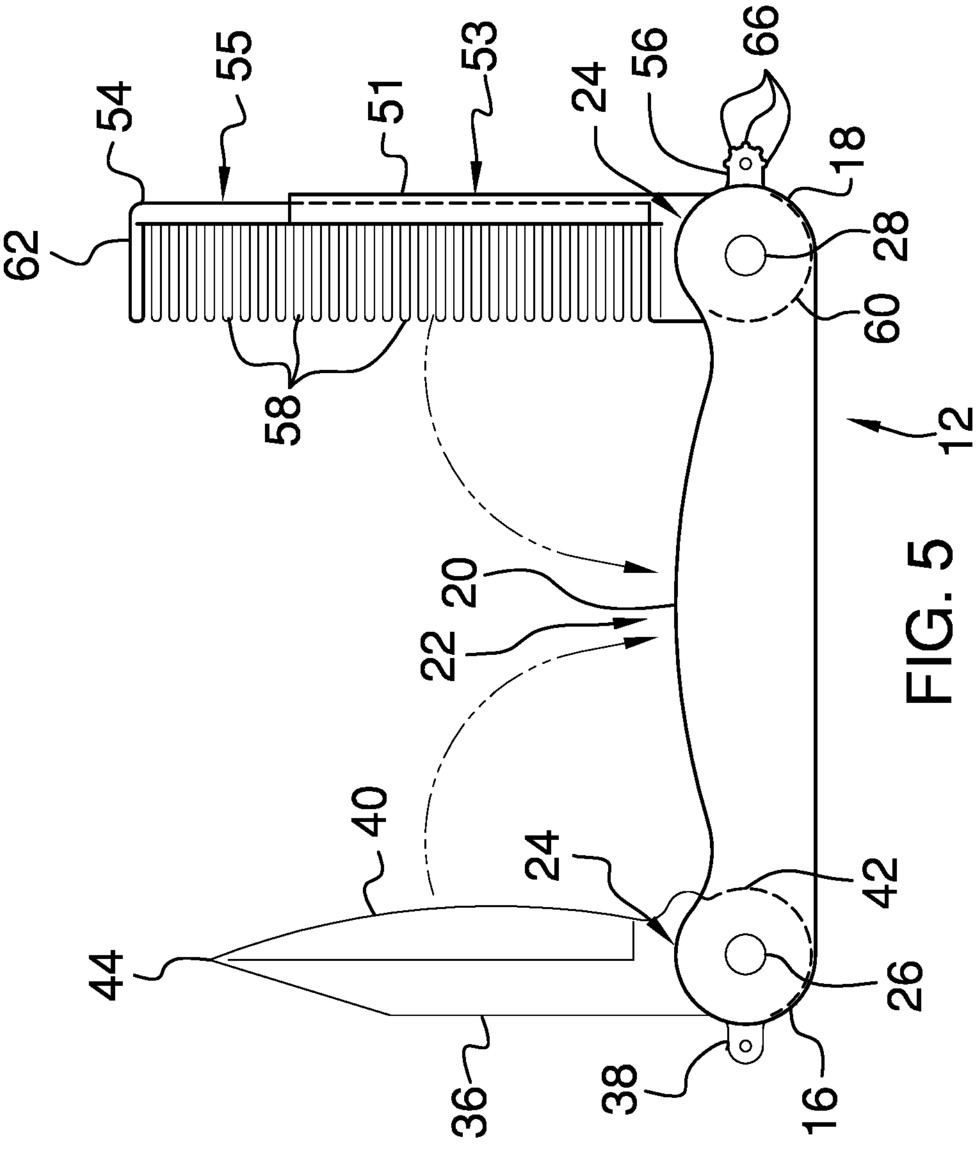
FIG. 5 is a right side view of an embodiment of the disclosure.
Figure 6:
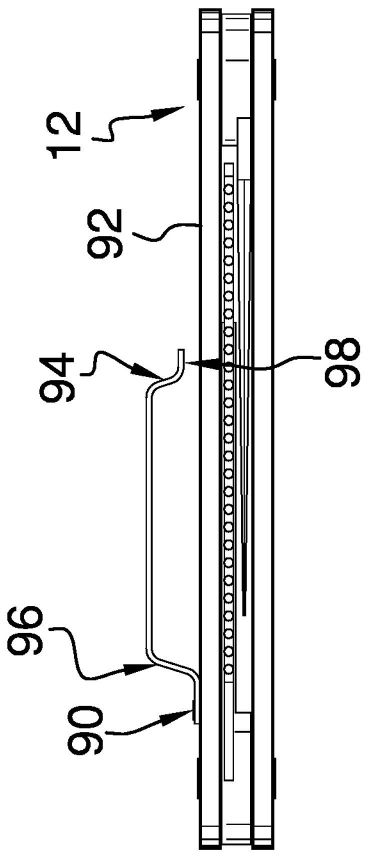
FIG. 6 is a top view of an embodiment of the disclosure.
Figure 7:
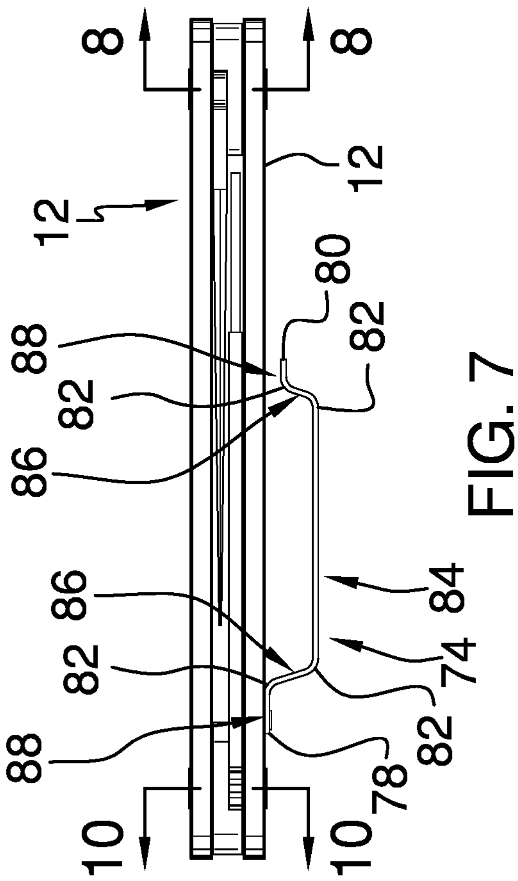
FIG. 7 is a bottom view of an embodiment of the disclosure.
Figure 8:
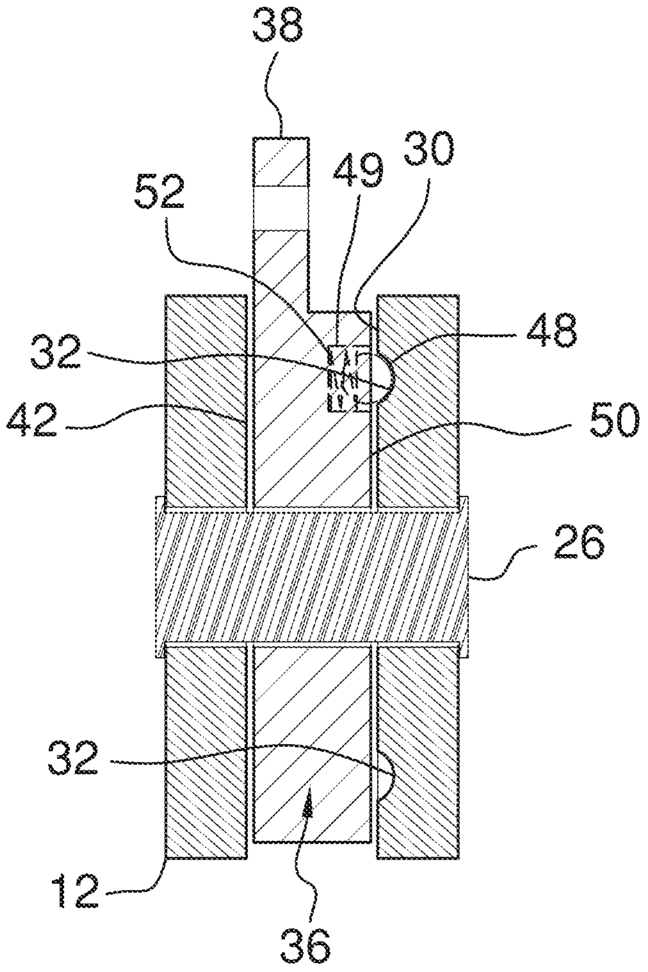
FIG. 8 is a cross sectional view taken along line 8-8 of FIG. 7 of an embodiment of the disclosure.
Figure 9:
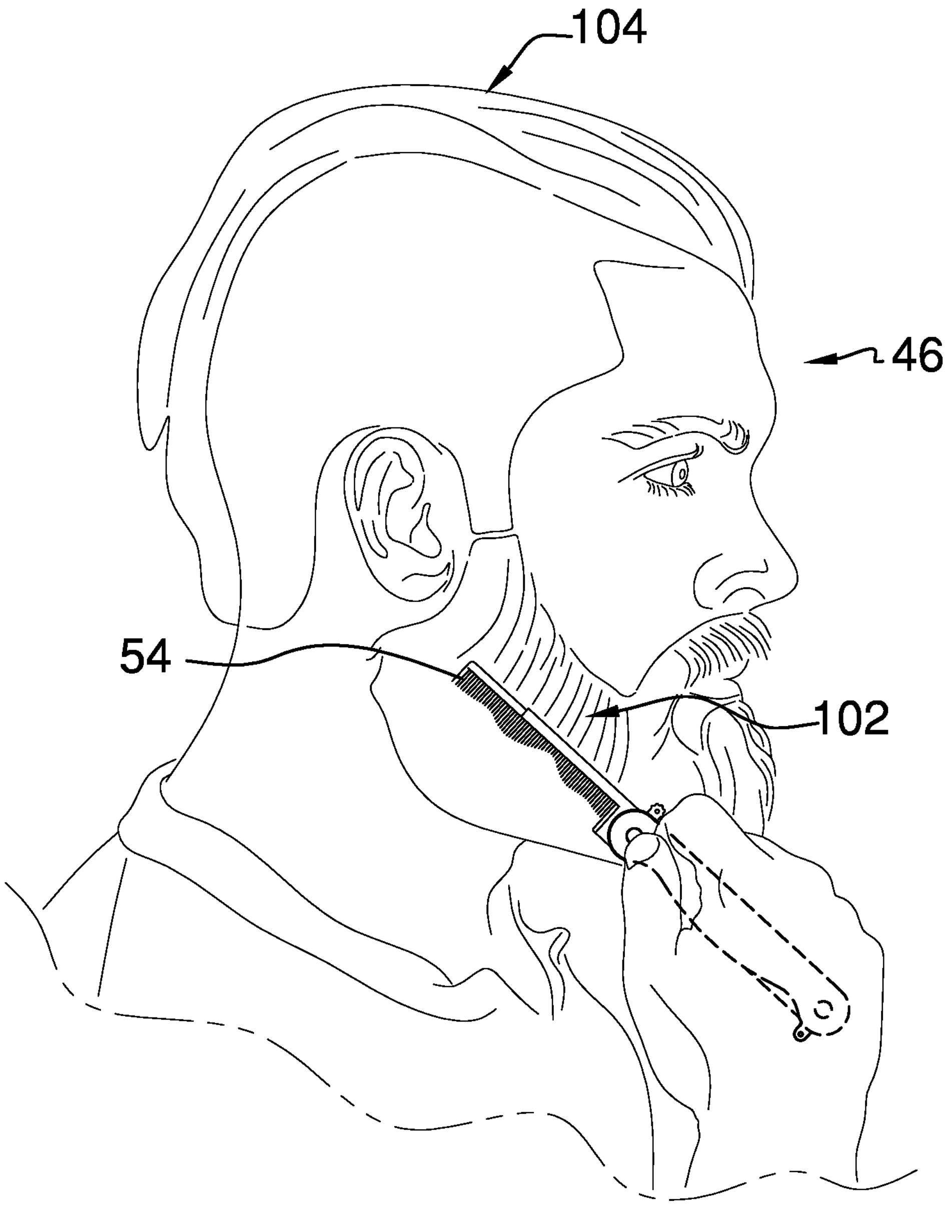
FIG. 9 is a perspective in-use view of an embodiment of the disclosure.
Figure 10:
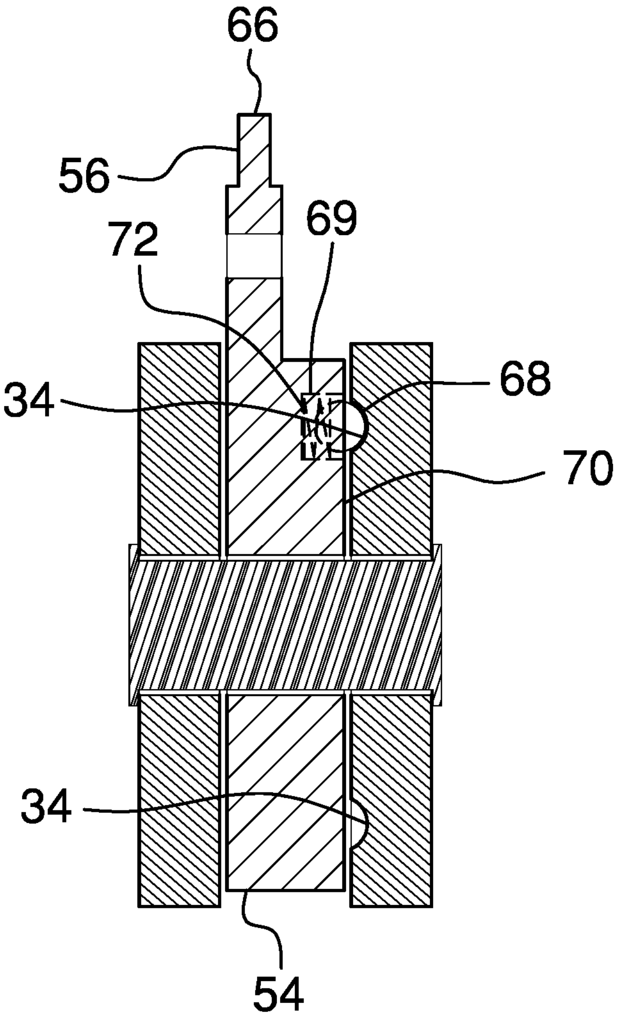
FIG. 10 is a cross sectional view taken along line 10-10 of FIG. 7 of an embodiment of the disclosure.

With reference now to the drawings, and in particular to FIGS. 1 through 10 thereof, a new utility knife device embodying the principles and concepts of an embodiment of the disclosure and generally designated by the reference numeral 10 will be described.

As best illustrated in FIGS. 1 through 10, the utility beard knife device 10 generally comprises a handle 12 that has a channel 14 extending lengthwise through the handle 12. The handle 12 has a first end 16 and a second end 18 and a top edge 20 extending between the first end 16 and the second end 18. The handle 12 is elongated between the first end 16 and the second end 18 and each of the first end 16 and the second end 18 is rounded. The channel 14 extends downwardly into the top edge 20 and outwardly through each of the first end 16 and the second end 18. The top edge 20 undulates to define a prominence 22 located between a pair of lobes 24 which are each associated with a respective one of the first end 16 and the second end 18.

The handle 12 has a first pivot 26 that is integrated into the lobe 24 associated with the first end 16 and the handle 12 has a second pivot 28 that is integrated into the lobe associated with the second end 18. Additionally, each of the first pivot 26 and the second pivot 28 extends across the channel 14. The channel 14 has a first lateral bounding surface 30 and the handle 12 has a series of first divots 32 each extending into the first lateral bounding surface 30. The series of first divots 32 is arranged into a circle extending around the first pivot 26. Additionally, the handle 12 has a series of second divots 34 each extending into the first lateral bounding surface 30. The series of second divots 34 is arranged into a circle extending around the second pivot 28.

A blade 36 is provided and the blade 36 is pivotally coupled to the handle 12. The blade 36 is positionable in a stored position having the blade 36 positioned in the channel 14 and the blade 36 is positionable in a deployed position having the blade 36 extending away from the handle 12. A first knob 38 extends away from the blade 36 thereby facilitating the first knob 38 to be gripped for urging the blade 36 between the stored position and the deployed position. The blade 36 has a cutting edge 40 extending between a tang 42 and a tip 44 of the blade 36; the tang 42 is positioned in the channel 14 in the handle 12 having the tang 42 pivotally engaging the first pivot 26.

The first knob 38 extends away from the top edge 20 at a point located on the tang 42 such that the first knob 38 extends outwardly from the channel 14. In this way the first knob 38 can be pushed by a user 46 for urging the blade 36 between the stored position and the deployed position. The blade 36 extends away from the second end 18 of the handle 12 when the blade 36 is in the deployed position having the cutting edge 40 being exposed. Conversely, the blade 36 extends toward the second end 18 of the handle 12 when the blade 36 is in the stored position having the cutting edge 40 being positioned in the channel 14. The blade 36 may be comprised of steel, aluminum, titanium or other material commonly used in knife manufacturing.

A first ball 48 is movably positioned in a first ball well 49 in a lateral surface 50 of the tang 42 of the blade 36. The first ball 48 is aligned with the series of first divots 32 in the first lateral bounding surface 30 of the channel 14 in the handle 12 thereby facilitating the first ball 48 to extend into a respective one of the series of first divots 32 when the blade 36 is pivoted. In this way the blade 36 is movably retained in variety of positions between the stored position and the deployed position. A first biasing member 52 is positioned in the first ball well 49 for biasing the first ball 48 outwardly from the first ball well 49 thereby facilitating the first ball 48 to extend into a respective one of the series of first divots 32.

A comb 54 is provided and the comb 54 is pivotally coupled to the handle 12. The comb 54 is positionable in a stored position having the comb 54 positioned in the channel 14. Conversely, the comb 54 is positionable in a deployed position having the comb 54 extending away from the handle 12. The comb 54 has a second knob 56 extending away from the comb 54 thereby facilitating the second knob 56 to be gripped for urging the comb 54 between the stored position and the deployed position. The comb 54 has a plurality of bristles 58 which are spaced apart from each other and are distributed between a coupled end 60 of the comb 54 and a free end 62 of the comb 54. A spine 51 of the comb 54 may comprise a first section 53 which slidably engages a second section 55 to facilitate the spine 51 to be lengthened or shortened. Additionally, the comb 54 may be comprised of plastic, bamboo, steel or other type of rigid material.

The coupled end 60 is positioned in the channel 14 in the handle 12 having the comb 54 pivotally engaging the second pivot 28 at a point located proximate the coupled end. The coupled end 60 is rounded. The second knob 56 extends away from an upper edge of the comb 54 at a point located on the coupled end 60 such that the second knob 56 extends outwardly from the channel 14. In this way the second knob 56 can be pushed by the user 46 for urging the comb 54 between the stored position and the deployed position. The second knob 56 has a plurality of lobes 66 radiating away from the second knob 56 to facilitate the user 46 to grip the second knob 56. The comb 54 extends away from the first end 16 of the handle 12 when the comb 54 is in the deployed position so that the bristles 59 are exposed. Conversely, the comb 54 extends toward the first end 16 of the handle 12 when the comb 54 is in the stored position so that the bristles 59 are positioned in the channel 14, A second ball 68 is movably positioned in a second ball well 69 in a lateral surface 70 of the comb 54 at a point located proximate the second pivot 28. The second ball 68 is aligned with the series of second divots 34 in the first lateral bounding surface 30 of the channel 14 in the handle 12. In this way the second ball 68 can extend into a respective one of the series of second divots 34 when the comb 54 is pivoted for movably retaining the comb 54 in variety of positions between the stored position and the deployed position. A second biasing member 72 is positioned in the second ball well 69 for biasing the second ball 68 outwardly from the second ball well 69. In this way the second ball 68 can extend into a respective one of the series of second divots 34.

A belt clip 74 is provided and the belt clip 74 is attached to the handle 12. The belt clip 74 can be attached to a garment for carrying the handle 12. The garment may be a waist band of a pair of pants, a belt, a shirt pocket or other type edge of a garment, The belt clip 74 has a primary end 78 and a secondary end 80; the belt clip 74 has a plurality of bends 82 distributed between the primary end 78 and the secondary end 80 to define a central portion 84 extending between a pair of leg portions 86 and a pair of feet portions 88 extending away from a respective one of the leg portions 86. Each of the feet portions 88 lies on a plane oriented parallel to the central portion 84 having each of the leg portions 86 angling outwardly between the central portion 84 and the respective foot portion 88.

A first one of the fect portions 90 lies flat on and is attached to an outwardly facing surface 92 of the handle 12. A first one of the leg portions 96 has length that is greater than a length of a second one of the leg portions 96. Thus, a second one of the foot portions 98 is spaced from the outwardly facing surface 92 of the handle 12. In this way the second foot portion 98 facilitates an edge of the garment to be slid between the second foot portion 98 and the outwardly facing surface 92 of the handle 12, In use, the first knob 38 is pushed to urge the blade 36 into the deployed position to employ the blade 36. In this way the blade 36 can be employed for cutting open boxes, cutting through material or for personal protection. Conversely, the first knob 38 can be pushed to urge the blade 36 into the stored position. The second knob 56 can be pushed to urge the comb 54 into the deployed position. As is most clearly shown in FIG. 9, the comb 54 can be employed for combing the user's beard 102 and hair 104, for example, to facilitate the user 46 to maintain their beard 102 and their hair 104 throughout the day. The second knob 56 can be pushed to urge to comb 54 into the stored position.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A utility beard knife device for cutting and combing beard hair, said device comprising:

a handle having a channel extending lengthwise through said handle;

a blade being pivotally coupled to said handle, said blade being positionable in a stored position having said blade being positioned in said channel, said blade being positionable in a deployed position having said blade extending away from said handle, said blade having a first knob extending away from said blade thereby facilitating said first knob to be gripped for urging said blade between said stored position and said deployed position;

a first lock being movably integrated in said blade;

a comb being pivotally coupled to said handle, said comb being positionable in a stored position having said comb being positioned in said channel, said comb being positionable in a deployed position having said comb extending away from said handle, said comb having a second knob extending away from said comb thereby facilitating said second knob to be gripped for urging said comb between said stored position and said deployed position;

a second lock being movably integrated into said comb;

a belt clip being attached to said handle wherein said belt clip is configured to be attached to a garment for carrying said handle;

wherein said handle has a first end and a second end and a top edge extending between said first end and said second end, said handle being elongated between said first end and said second end, each of said first end and said second end being rounded, said channel extending downwardly into said top edge and outwardly through each of said first end and said second end;

wherein said top edge undulates to define a prominence located between a pair of lobes which are each associated with a respective one of said first end and said second end;

wherein said handle has a first pivot being integrated into said lobe associated with said first end;

wherein said handle has a second pivot being integrated into said lobe associated with said second end;

wherein each of said first pivot and said second pivot extends across said channel;

wherein said channel has a first lateral bounding surface;

wherein said handle has a series of first divots each extending into said first lateral bounding surface, said series of first divots being arranged into a circle extending around said first pivot; and wherein said handle has a series of second divots each extending into said first lateral bounding surface, said series of second divots being arranged into a circle extending around said second pivot.

2. The device according to claim 1, wherein:

said blade has a cutting edge extending between a tang and a tip of said blade;

said tang is positioned in said channel in said handle having said tang pivotally engaging said first pivot; and said first knob extends away from said top edge at a point located on said tang such that said first knob extends outwardly from said channel wherein said first knob is configured to be pushed by a user for urging said blade between said stored position and said deployed position.

3. The device according to claim 2, wherein said first lock comprises a first ball being movably positioned in a first ball well in a lateral surface of said tang of said blade, said first ball being aligned with said series of first divots in said first lateral bounding surface of said channel in said handle thereby facilitating said first ball to extend into a respective one of said series of first divots when said blade is pivoted for movably retaining said blade at a variety of positions between said stored position and said deployed position.

4. The device according to claim 2, further comprising a first biasing member being positioned in said first ball well for biasing said first ball outwardly from said first ball well thereby facilitating said first ball to extend into a respective one of said series of first divots.

5. The device according to claim 1, wherein:

said blade extends away from said second end of said handle when said blade is in said deployed position having a cutting edge of said blade being exposed; and said blade extends toward said second end of said handle when said blade is in said stored position having said cutting edge being positioned in said channel.

6. The device according to claim 1, wherein:

said comb has a plurality of bristles being spaced apart from each other and being distributed between a coupled end of said comb and a free end of said comb;

said coupled end is positioned in said channel in said handle having said comb pivotally engaging said second pivot;

said second knob extends away from an upper edge of said comb at a point located on said coupled end such that said second knob extends outwardly from said channel wherein said second knob is configured to be pushed by a user for urging said comb between said stored position and said deployed position;

said second knob has a plurality of lobes radiating away from said second knob wherein said plurality of lobes is configured to facilitate the user to grip said second knob; and said comb extends away from said first end of said handle when said comb is in said deployed position having said bristle being exposed, said comb extending toward said first end of said handle when said comb is in said stored position having said bristles being positioned in said channel.

7. The device according to claim 6, wherein said second lock comprises a second ball being movably positioned in a second ball well in a lateral surface of said comb located proximate said second pivot, said second ball being aligned with said series of second divots in said first lateral bounding surface of said channel in said handle thereby facilitating said second ball to extend into a respective one of said series of second divots when said comb is pivoted for movably retaining said comb at a variety of positions between said stored position and said deployed position.

8. The device according to claim 7, further comprising a second biasing member being positioned in said second ball well for biasing said second ball outwardly from said second ball well thereby facilitating said second ball to extend into a respective one of said series of second divots.

9. The device according to claim 1, wherein said belt clip has a primary end and a secondary end, said belt clip having a plurality of bends being distributed between said primary end and said secondary end to define a central portion extending between a pair of leg portions and a pair of foot portions extending away from a respective one of said leg portions, each of said foot portions lying on a plane oriented parallel to said central portion having each of said leg portions angling outwardly between said central portion and said respective foot portion.

10. A utility beard knife device for cutting and combing beard hair, said device comprising:

a handle having a channel extending lengthwise through said handle;

a blade being pivotally coupled to said handle, said blade being positionable in a stored position having said blade being positioned in said channel, said blade being positionable in a deployed position having said blade extending away from said handle, said blade having a first knob extending away from said blade thereby facilitating said first knob to be gripped for urging said blade between said stored position and said deployed position;

a first lock being movably integrated in said blade;

a comb being pivotally coupled to said handle, said comb being positionable in a stored position having said comb being positioned in said channel, said comb being positionable in a deployed position having said comb extending away from said handle, said comb having a second knob extending away from said comb thereby facilitating said second knob to be gripped for urging said comb between said stored position and said deployed position;

a second lock being movably integrated into said comb; and a belt clip being attached to said handle wherein said belt clip is configured to be attached to a garment for carrying said handle;

wherein said belt clip has a primary end and a secondary end, said belt clip having a plurality of bends being distributed between said primary end and said secondary end to define a central portion extending between a pair of leg portions and a pair of foot portions extending away from a respective one of said leg portions, each of said foot portions lying on a plane oriented parallel to said central portion having each of said leg portions angling outwardly between said central portion and said respective foot portion; and wherein a first one of said foot portions lies flat on an outwardly facing surface of said handle, a first one of said leg portions having length being greater than a length of a second one of said leg portions such that a second one of said foot portions is spaced from said outwardly facing surface of said handle wherein said second foot portion is configured to facilitate an edge of the garment to be slid between said second foot portion and said outwardly facing surface of said handle.

11. A utility beard knife device for cutting and combing beard hair, said device comprising:

a handle having a channel extending lengthwise through said handle, said handle having a first end and a second end and a top edge extending between said first end and said second end, said handle being elongated between said first end and said second end, each of said first end and said second end being rounded, said channel extending downwardly into said top edge and outwardly through each of said first end and said second end, said top edge undulating to define a prominence located between a pair of lobes which are each associated with a respective one of said first end and said second end, said handle having a first pivot being integrated into said lobe associated with said first end, said handle having a second pivot being integrated into said lobe associated with said second end, each of said first pivot and said second pivot extending across said channel, said channel having a first lateral bounding surface, said handle having a series of first divots each extending into said first lateral bounding surface, said series of first divots being arranged into a circle extending around said first pivot, said handle having a series of second divots each extending into said first lateral bounding surface, said series of second divots being arranged into a circle extending around said second pivot;

a blade being pivotally coupled to said handle, said blade being positionable in a stored position having said blade being positioned in said channel, said blade being positionable in a deployed position having said blade extending away from said handle, said blade having a first knob extending away from said blade thereby facilitating said first knob to be gripped for urging said blade between said stored position and said deployed position, said blade having a cutting edge extending between a tang and a tip of said blade, said tang being positioned in said channel in said handle having said tang pivotally engaging said first pivot, said first knob extending away from said top edge at a point located on said tang such that said first knob extends outwardly from said channel wherein said first knob is configured to be pushed by a user for urging said blade between said stored position and said deployed position, said blade extending away from said second end of said handle when said blade is in said deployed position having said cutting edge being exposed, said blade extending toward said second end of said handle when said blade is in said stored position having said cutting edge being positioned in said channel;

a first ball being movably positioned in a first ball well in a lateral surface of said tang of said blade, said first ball being aligned with said series of first divots in said first lateral bounding surface of said channel in said handle thereby facilitating said first ball to extend into a respective one of said series of first divots when said blade is pivoted for movably retaining said blade at a variety of positions between said stored position and said deployed position;

a first biasing member being positioned in said first ball well for biasing said first ball outwardly from said first ball well thereby facilitating said first ball to extend into a respective one of said series of first divots;

a comb being pivotally coupled to said handle, said comb being positionable in a stored position having said comb being positioned in said channel, said comb being positionable in a deployed position having said comb extending away from said handle, said comb having a second knob extending away from said comb thereby facilitating said second knob to be gripped for urging said comb between said stored position and said deployed position, said comb having a plurality of bristles being spaced apart from each other and being distributed between a coupled end of said comb and a free end of said comb, said coupled end being positioned in said channel in said handle having said comb pivotally engaging said second pivot at a point located proximate said coupled end, said coupled end being rounded, said second knob extending away from an upper edge of said comb at a point located on said coupled end such that said second knob extends outwardly from said channel wherein said second knob is configured to be pushed by the user for urging said comb between said stored position and said deployed position, said second knob having a plurality of lobes radiating away from said second knob wherein said plurality of lobes is configured to facilitate the user to grip said second knob, said comb extending away from said first end of said handle when said comb is in said deployed position having said bristles being exposed, said comb extending toward said first end of said handle when said comb is in said stored position having said bristles being positioned in said channel;

a second ball being movably positioned in a second ball well in a lateral surface of said comb at a point located proximate said second pivot, said second ball being aligned with said series of second divots in said first lateral bounding surface of said channel in said handle thereby facilitating said second ball to extend into a respective one of said series of second divots when said comb is pivoted for movably retaining said comb at a variety of positions between said stored position and said deployed position;

a second biasing member being positioned in said second ball well for biasing said second ball outwardly from said second ball well thereby facilitating said second ball to extend into a respective one of said series of second divots; and a belt clip being attached to said handle wherein said belt clip is configured to be attached to a garment for carrying said handle, said belt clip having a primary end and a secondary end, said belt clip having a plurality of bends being distributed between said primary end and said secondary end to define a central portion extending between a pair of leg portions and a pair of foot portions extending away from a respective one of said leg portions, each of said foot portions lying on a plane oriented parallel to said central portion having each of said leg portions angling outwardly between said central portion and said respective foot portion, a first one of said foot portions lying flat on an outwardly facing surface of said handle, a first one of said leg portions having length being greater than a length of a second one of said leg portions such that a second one of said foot portions is spaced from said outwardly facing surface of said handle wherein said second foot portion is configured to facilitate an edge of the garment to be slid between said second foot portion and said outwardly facing surface of said handle.

* * * * *